Patented Nov. 13, 1934

1,980,338

UNITED STATES PATENT OFFICE 1,980,338

PURIFICATION AND BLEACHING OF WAXES

Arthur Hough, Passaic, N. J., assignor to Theodor Leonhard Wax Company, Haledon, N. J., a corporation of New Jersey No Drawing. Application August 17, 1931, Serial No. 557,727

2 Claims. (Cl. 87—19)

The present invention relates to certain very important and valuable discoveries relating to the purification and bleaching of waxes, and particularly beeswax. Actual use of the process has proven it to be highly economical and very practical.

The invention will be described in detail in its preferred form, in connection with beeswax, but it is applicable also to carnauba wax and, I believe to various others.

I have found that phosphoric acid, either the ortho or the meta compound has a very useful action on the wax, completely removing many impurities, both those in plain suspension and those held in a colloidal condition. The impure wax, melted and subjected to the influence of phosphoric acid becomes clarified in a manner quite impossible of attainment with any other acid which has heretofore been used. I am aware that in the past, sulphuric and hydrochloric acids have been tried for this purpose, and while they clarify the wax better than plain settling over water, the wax having been melted and stirred with the water, yet I have found that the results obtainable by the use of phosphoric acid are so far superior than anything obtained by prior methods, as to be revolutionary.

I have found during my researches and in actual plant practice, that the variety of phosphoric acid known as "crude" is better for my purpose than the chemically pure acid, one particular sample of this crude phosphoric acid analyzing as follows:

| | Per cent |
|---|---|
| $P_2O_5$ | 21.00 |
| (Equal to $H_3PO_4$ | 29.18) |
| $Al_2O_3$ | .64 |
| $Fe_2O_3$ | .92 |
| $SO_3$ | .69 |
| CaO | .93 |
| Organic material | .10 |

This analysis covers an average grade of crude phosphoric acid just as it is obtained from the decomposition of phosphate rock, and without any further purification. This grade is of course of the lowest market value (i. e. is the cheapest, for a given amount of actual $H_3PO_4$), and is therefore very economical to use for the present purpose. This is given merely of a highly suitable phosphoric acid, but the invention is not limited to acid of this analysis.

As an example of the process of purifying the crude wax, I give the following as an illustration: I melt 3,000 pounds of the wax, in a large tank having previously placed in the tank about 750 pounds of water (corresponding to about one-fourth of the weight of the wax). In order to preserve this ratio of water to wax during the treatment, I prefer to heat the mass by means of closed steam coils. The water and wax are heated up to a temperature preferably about 90 to 95° C. (say 93° C.), i. e. a little below the boiling point of water. I add the dilute crude phosphoric acid mentioned above, in amount equal to about 2% (for example) of the wax (=0.6% actual $H_3PO_4$ based on the wax), and stir vigorously, by one of the types of motor driven stirrers known as "lightning" mixer, whereby a most intimate mixing of water and acid and wax is obtained. The initial mixture of water and acid i. e. 60 pounds of the crude dilute acid in 750 pounds of water represents approximately a 2.4% solution of $H_3PO_4$. The mixing should proceed for about 10 minutes, at about 90 to 95° C., when the stirring is stopped and the tank may be covered up (to prevent rapid cooling) and allowed to stand for several hours, when the wax will be found to be completely clarified. All suspended and colloidal matter will have been removed, and thrown to the bottom of the wax and largely into the acidulated water, the wax will be found to be what is known as pure refined wax, and of a clear, almost transparent character. This remarkable effect can be obtained by the use of very little of the phosphoric acid, and as stated above, the crude acid actually works better than pure $H_3PO_4$. This may be due to the coagulating effect of the iron, aluminum and other salts (impurities) dissolved in the crude phosphoric acid, these salts will be found, together with the impurities of the wax, in the water under the clarified wax. Some of the impurities may be in the bottom layer of the wax.

Most of the molten wax can now be decanted in a clear condition, and the bottom layer of the wax can be retreated or otherwise purified.

In this example I have referred to the use of 60 pounds of the crude phosphoric acid in the treatment of a particular grade of wax. In other cases I have used much less, say 25 or 30 pounds of the acid (with 3000 pounds of wax and 600 to 800 pounds of water), while securing very satisfactory results. These variations would correspond to acid concentrations of about 1 to nearly 4%.

In commercial practice after treatment with phosphoric acid, and stirring, the wax begins to clear immediately, the impurities settling down through the bulk of wax towards the bottom. If left to settle long enough, the impurities will all go to the very bottom of the wax, appearing as a spongy matter, with such inorganic substances as may be present and of a higher specific gravity than wax or water, going to the bottom of the vessel. In practice at the works, I allow the wax to settle over night as a matter of convenience. The wax may be treated at about 4 P. M. and then covered up. The tank being of very thick wood, when covered, I find the wax and water will hold the heat till the following morning, when operations commence. Thus I may allow the wax to stand therefor a matter of about 15 hours, although perhaps the settling is complete in much less time.

*Bleaching the wax.*—The clarified wax, is now ready to be bleached. This may be done by way of example in an apparatus as follows: A wooden tub, measuring about 50 inches diameter, and 60 inches high (inside measurements) is fitted with a powerful stirrer. This stirrer may conveniently be of the "turbo" type of impeller, 30 inches in diameter having 12 blades placed at an angle of about 30 degrees. This stirrer can be fitted on a steel shaft 2½ inches in diameter and covered with lead to a point as high as the top of the tub. The stirrer itself may be cast in one piece of antimony-lead alloy (preferably 5% antimony and 95% lead). The shaft is held in bearings some distance apart to give rigidity to the driving equipment. The shaft revolves at about 150 revolutions per minute, the action of the stirrer being preferably downwards to ensure perfect agitation or dispersion of the liquids. Obviously this apparatus is given merely by way of example.

About 1000 pounds of water (ordinary tap water will do), are placed in the tub, heated to about 65° C., and about 160 pounds of the crude dilute ortho phosphoric acid added, the stirrer is started and a few seconds mixing given. This gives a dilute phosphoric acid solution of about 4.7% strength. Then 1250 pounds of the clarified beeswax is added, this latter at a temperature of about 65° C. This represents about 3.8% of actual $H_3PO_4$ relatively to the wax. The wax, acid and water are now stirred continuously and into the mixture is run a solution of 50 pounds of potassium permanganate in 300 pounds of water at about 70° C. which has been slightly acidified by $H_3PO_4$. The bleaching action starts immediately, and is allowed to proceed until the end point of the bleaching is reached. This point is ascertained by testing the mixture in the following manner. A sample is dipped from the tank and allowed to stand in a beaker for a few minutes. If the end point is reached, it will be found that the clear wax will rise to the top, the oxides of manganese (product of reduction of permanganate) will fall to the bottom, and an intermediate zone of a pinkish solution will be apparent. If the end point is not reached, it will be seen that the wax does not separate well, and the process must be continued till such time as another similar test gives the desired result. When treating beeswax of average grade, this may require about an hour. When such end point is reached, the charge in the tub should be allowed to settle for a few minutes, when the bleached wax will be ready to be removed from the mother liquor. The latter is still acid in reaction.

This removal can be accomplished by running hot water into the bottom of the tub, (without first drawing off the acid solution) thereby raising the level of the wax to an outflow in the side of the tub, the wax flowing into a wash tank placed at the side of the bleach tub. This wash tank contains water, acidulated with $H_2SO_4$ to an extent of about .1%.

I have referred in this example to temperature at which the mixture of wax, acid, permanganate and water should be at the start, about 65° C. To explain this point. The important point to look to is the maximum temperature to go to during bleaching, and for the very best results, I have found this maximum temperature should not exceed 80° C. Now, in order to determine the temperature at which to start the process to reach this temperature, we have of course to consider the following:—Heat of reaction ($KMnO_4$ oxidation value or organic impurities in wax), specific heats of wax, water, and acid, and weights of same. In actual practice I find that in wood tubs where radiation factor is low, I can start with the mixture at about 65° C. At the same time, it must be remembered that in the case of a wax such as a very high grade of Chilian beeswax, or light Cuban beeswax, the organic impurities are so small that much less $KMnO_4$ is required and consequently less heat of reaction develops. In such a case, the charge may be as high as 70° C. at the start, and it will not exceed 80° C. at the finish. The pilot laboratory test will determine this point. Another thing of importance. A charge should always be allowed to proceed under its own heat of reaction. There is a curious phenomenon in this connection. If a bleach is in progress, and the temperature be checked by any method of cooling, and then raised again by heat from closed or open steam or hot water coils, the bleach is not good. The charge, starting at the low temperature should be allowed to find its maximum temperature by its own heat of reaction. This has been shown in commercial runs.

The time required to effect a bleach, after all ingredients are in the tub and stirrer started, is generally about one hour. This however may vary according to the grade of wax.

The object of this acidulation will be explained later. It is important to have this wash water slightly acid, if it is not, good results are difficult to obtain. The wax being now in the slightly acidulated water, best at about 80° C., by means of a rapid stirrer (such as was used for the clarification of the crude wax) the wax is given a thorough washing for example at about 80° C. for say 15 minutes. This may be called the "prewash" and is very important. After this prewash, the wax is allowed to settle, and the wash water is then run off by means of a cock at the bottom of the wash tank. Then another lot of water, slightly acidulated with $H_2SO_4$, also at about 80° C. is run in, and about two pounds of 93% $H_2SO_4$ is added, this acid should be diluted to 20% or less, before adding to the wax and water, as strong $H_2SO_4$ coming into contact with the bleached wax may affect its color. Brisk agitation is now continued and about three pounds of 100-volume hydrogen peroxide added. If 25-volume $H_2O_2$ is used, then proportionately more of it must be added. It will be found after 15 minutes stirring, that the wax has assumed a fine white color and need only be allowed to settle, the acid water drawn off, and another plain wash water at about 80° C. run into the tank keeping the water only on the acid side to methyl orange test to prevent actual alkalinity, due to the natural alkalinity of the water, and this stirred well and allowed to settle for a few hours when the white wax may be drawn off by a tap at the side of the tank, or preferably by displacement as described above, and this wax is now found to be highly bleached.

The wax may then be given one or more additional washings with distilled water, (preferably at about 80° C.) the object of which is to remove all (or substantially all) acidity, without running any risk of any alkaline reaction. This would be an advantageous addition to the process, if a supply of distilled water is available, but many commercial runs, without the washing with distilled water have given very satisfactory results. This wax which preferably has been kept molten throughout the treatment, can then be run into molds, and allowed to solidify by cooling.

In the several washings, I preferably use a temperature about 80° C. this procedure should be followed in all washing operations. At about this temperature, the wax is very fluid and agitates and washes better than if at a lower temperature. It is inadvisable to heat to a higher temperature, although no great amount of harm will result. It must be kept in mind that when beeswax is bleached, it is easily thrown off a shade or so in color by too much heating, so it is better to keep it at a reasonable temperature, and to avoid temperatures much above 80° C.

While I have given proportions and quantities, in the specific example, which are highly satisfactory, I do not limit the invention to these, since the same can be varied between rather wide limits, without departing from the invention. These figures show the preferred amounts when the crude wax is of average grade of purity. When a more impure wax is being treated, I would preferably use somewhat larger amounts of the chemicals even up to double the amounts given above, or even somewhat more, and the amount of water can remain as given above. Similarly when using a crude wax less impure than average grade, less of the chemicals can be used, even down to half the amounts above given.

The amounts of water given in the several chemical treatments can also be varied between wide limits, but the quantities stated above will be found very satisfactory.

It is important to place the phosphoric acid in the water in the bleach tank before running in the crude clarified wax. If this is not done, the natural alkalinity of the water may emulsify the wax, and this, whilst not very serious may easily prevent subsequent separation for some time, and thereby delay the process. It is very important (as has been found in commercial tests) to acidify the permanganate solution with phosphoric acid before running it into the wax. If the permanganate is not acidified, but run on to the wax even when this is mixed with the phosphoric in the bleach tub, there may be a local alkalinity arising at the instant the KMnO₄ solution strikes the wax, which may cause an emulsion, which would delay the process.

If this water in the washing steps be not acidified before the wax is run into it from the bleacher, the wax carrying practically no acid from bleacher, striking the large volume of water of natural alkalinity, this alkalinity has the well known effect on wax of causing a "souping" and yellowing of the bleached wax, and if this happens the white color cannot be regained. In other words, once bleached, wax must not come into contact with even the faintest trace of alkalinity.

*Use of further amount of sulphuric and peroxide of hydrogen when washing bleached wax.—* When the wax is passed from the bleacher to the wash tank it may and generally does carry a minute quantity of permanganate of potash and also a trace of the oxides of manganese in suspension. H₂O₂ in this case acts as a reducing agent, immediately reducing both these reagents to the lowest oxides of manganese, and these are immediately taken up by the H₂SO₄ to produce MnSO₄ which of course is readily soluble in the water, and the highly bleached and perfectly white wax is the result. Other reducing agents may be used as sodium bisulphite SO₂ etc., but these do not act nearly so well as H₂O₂.

*Importance of the pre-wash.—* When the wax has been bleached, it will contain iron and manganese salts and probably other salts present in the reagents at the start. The pre-wash is to remove such salts, which it does most effectually and the acid present of course prevents such salts being acted upon by natural alkalinity of the water which would have the effect of "fixing" the iron and manganese in the wax, and imparting to it the characteristic color of manganese and iron on organic matter. Wax, like cellulose, has a great affinity for these substances.

Heretofore processes of bleaching wax and particularly beeswax depended on the use of oxidizing agents, such as chromic acid, bichromate potassium or sodium and sulphuric acid, permanganate of potash and sulphuric acid, perborate of soda and many others, are well known but the performance of these reagents is utterly different from the action of phosphoric acid, and do not give comparable results.

When H₂SO₄ is used with KMnO₄ for bleaching wax, by certain processes previously suggested, the acid to sufficiently decompose the KMnO₄ has to be of such strength as to actually attack some components of the wax, injuring its quality. The action is so violent as to produce violent frothing in the bleach tub. As an instance of this I may state that in a bleach tub of the dimensions given above, only 600 pounds of wax could be used in a charge, by the old way (KMnO₄ plus H₂SO₄), due to frothing. By the new way charges of 1250 pounds are regularly run, in this tank without any sign of frothing. Phosphoric acid is the one acid that (within the ranges of concentration given above) does not attack the true wax in any way, and therefore the product contains the original values of myricin, cerin, and cerolein. This is a great advance over the prior art. Moreover, a large portion of the phosphoric acid may be recovered and used over again as it undergoes no change during the process, and the manganese oxides may also be largely recovered and marketed or reworked into KMnO₄. To sum up this new process of firstly clarifying the crude wax, by treatment with phosphoric acid and then bleaching by this new process it is believed to be an important advance in the industry.

I have found that the crude and impure phosphoric acid is not only superior to the pure acid in the pre-treatment process, but also in the actual bleaching process. I am using and prefer to use, the crude acid with permanganate. The iron, aluminum and calcium compounds in the crude phosphoric acid (all of which are soluble, to some extent at least), may have some useful effect in the process.

I have referred above to the use of potassium permanganate. Other permanganates such as the sodium compound, can also be used.

If it is desired to recover the phosphoric acid in the displacement step without dilution, then in place of the hot water mentioned for raising the level of bleached wax, some of the phosphoric acid from a previous bleaching run may be employed for this purpose, this preferably being hot, say 80° C. In this way, the phosphoric acid may be used for several cycles, before it is unfit for use. To start this cyclic operation, of course enough phosphoric acid must be on hand for the displacement of the bleached wax of the first batch, but after this, there will be plenty of the acid from previous runs to carry on. Great economy results from this procedure, as for several cycles only the mechanical losses of acid have to be compensated for by addition of fresh acid.

I claim:

1. A process of treating vegetable and/or animal wax to purify the same, which comprises agitating the wax while in contact with hot water, with phosphoric acid of about 1 to 8% strength, said acid containing soluble iron and aluminum compounds, at not considerably above the normal boiling point of water, then settling and separating the aqueous liquid and impurities and the refined wax from each other.

2. A process of bleaching wax which comprises treating the molten wax with an acid mixture comprising a permanganate and phosphoric acid and being diluted with many times its own weight of water, while warm, and containing soluble iron and aluminum compounds, and agitating until the bleaching is sufficiently accomplished.

ARTHUR HOUGH.